United States Patent
Jones

(10) Patent No.: US 6,313,446 B1
(45) Date of Patent: Nov. 6, 2001

(54) DISPOSABLE LINER AND COOKER SYSTEM WITH DISPOSABLE LINER

(76) Inventor: Teresa A. Jones, Rte. 1, Box 335, Jacksonville, TX (US) 75766

( * ) Notice: Subject to any disclaimer, the term of this patent is extended or adjusted under 35 U.S.C. 154(b) by 0 days.

(21) Appl. No.: 09/642,441

(22) Filed: Aug. 21, 2000

(51) Int. Cl.$^7$ ................................................. F27D 11/00
(52) U.S. Cl. ........................ 219/433; 220/573.1; 99/447
(58) Field of Search ................................... 219/442, 453, 219/621; 220/573.1, 23.86; 99/447, 415, 349, 417

(56) References Cited

U.S. PATENT DOCUMENTS

| | | | |
|---|---|---|---|
| 3,724,711 | * | 4/1973 | George et al. ..................... 220/573.1 |
| 3,745,290 | * | 7/1973 | Harnden ................................ 219/261 |
| 3,881,090 | * | 4/1975 | Scott ..................................... 219/433 |
| 3,908,111 | * | 9/1975 | Du Bois et al. ...................... 219/442 |
| 3,934,748 | * | 1/1976 | Racz ....................................... 99/447 |
| 4,164,174 | * | 8/1979 | Wallsten ................................ 99/415 |
| 4,184,421 | | 1/1980 | Ahlgren ................................ 99/450 |
| 4,258,695 | * | 3/1981 | McCarton et al. ................. 220/573.1 |
| 4,307,287 | * | 12/1981 | Weiss ................................... 219/442 |
| 4,320,699 | * | 3/1982 | Binks ..................................... 99/349 |
| 4,714,012 | | 12/1987 | Hernandez ............................. 99/444 |
| 5,436,434 | | 7/1995 | Baird ..................................... 219/734 |
| 5,447,097 | | 9/1995 | Rhee ...................................... 99/450 |
| 5,515,990 | * | 5/1996 | Popeil et al. ....................... 220/23.86 |
| 5,586,491 | | 12/1996 | Diller et al. ........................... 99/450 |
| 5,613,427 | | 3/1997 | Wiley ..................................... 99/446 |
| 5,865,104 | * | 2/1999 | Sham et al. ............................ 99/417 |

\* cited by examiner

Primary Examiner—Teresa Walberg
Assistant Examiner—Leonid Fastovsky
(74) Attorney, Agent, or Firm—Joseph N. Breaux

(57) ABSTRACT

A disposable liner formed of aluminum sheeting having a liner cooking compartment formed therein and a liner lip formed into an upper perimeter lip engaging configuration; and a cooker system that includes a burner unit, a ceramic pot, a disposable, formed aluminum sheeting liner member, a cooking lid, and a storage lid. The burner unit, ceramic pot and cooking lid are of conventional slow cooker construction. The disposable, formed aluminum sheeting liner member is sized to fit into the cooking cavity of the ceramic pot and has a liner lip formed into an upper perimeter lip engaging configuration for form fitting into connection with the upper perimeter lip of the ceramic pot and to engage and hold the lid lip of the storage lid. In use, the liner member is removed from the ceramic pot and sealed for storage with the storage lid. The ceramic pot then requires little or no clean up.

1 Claim, 2 Drawing Sheets

DISPOSABLE LINER AND COOKER SYSTEM WITH DISPOSABLE LINER

This application is related to co-pending U.S. Utility patent application Ser. No. 09/429,091.

TECHNICAL FIELD

The present invention relates to cooking systems and more particularly to a disposable liner formed of aluminum sheeting having a liner cooking compartment formed therein and sized to fit into the cooking cavity of a pot and a liner lip formed into an upper perimeter lip engaging configuration; and a cooker system with disposable liner that is easy to clean and that includes a burner unit, a ceramic pot, a disposable, formed aluminum sheeting liner member, a cooking lid, and a storage lid; the burner unit including a cooker housing, an electric burner element positioned within a ceramic pot receiving cavity formed into the cooker housing and a burner intensity controller having a selector knob rotatably mounted to an exterior of the cooker housing and wired in connection between a power supply cord and the electric burner element; the ceramic pot having a cooking cavity defined within a bottom exterior portion sized to fit into the ceramic pot receiving cavity of the cooker housing and an upper perimeter lip sized to contact and sit on an upper lip of the cooker housing when the bottom exterior portion is fit into the ceramic pot receiving cavity of the cooker housing; the disposable, formed aluminum sheeting liner member having a liner cooking compartment formed therein and sized to fit into the cooking cavity of the ceramic pot and having a liner lip formed into an upper perimeter lip engaging configuration for form fitting into connection with the upper perimeter lip of the ceramic pot; the cooking lid being sized to sit onto the liner lip to seal the liner cooking compartment; the storage lid having a lid lip shaped to engage and hold the liner lip of the aluminum sheeting liner member such that the liner cooking compartment is sealed.

BACKGROUND ART

Many individuals find cleaning pots and/or pans after cooking to be time consuming and undesirable. It would be a benefit, therefore, to have a disposable liner that could be positioned into the cooking pot or pan within which the food would be cooked. After cooking the disposable liner could removed from the pot or pan and disposed of without the need for scrubbing burnt on food residue from the interior of the pot or pan.

Because slow cookers provide a simple cooking method for cooking particular dishes such as stews, pot roasts, and the like. Although slow cookers cook these types of dishes in a desirable fashion, the ceramic cooking pot of the slow cooker can often become encrusted with burned on food residue which is difficult to clean. It would be desirable, therefore, to have a slow cooker system that included a disposable liner member that fit into the ceramic cooking pot of the slow cooker that could be removed and discarded leaving ceramic cooking pot needing little or no clean up. Because all of the food cooked may not be consumed in one meal, it would be further desirable if the cooker system also included a storage lid member that snap fit onto the disposable liner member to seal the food cooking compartment of the liner member for storage in a refrigerator or freezer.

GENERAL SUMMARY DISCUSSION OF INVENTION

It is thus an object of the invention to provide a disposable liner formed of aluminum sheeting having a liner cooking compartment formed therein and sized to fit into the cooking cavity of a pot pot and a liner lip formed into an upper perimeter lip engaging configuration.

It is thus an object of the invention to provide a cooker system with disposable liner that includes a burner unit, a ceramic pot, a disposable, formed aluminum sheeting liner member, a cooking lid, and a storage lid; the burner unit including a cooker housing, an electric burner element positioned within a ceramic pot receiving cavity formed into the cooker housing and a burner intensity controller having a selector knob rotatably mounted to an exterior of the cooker housing and wired in connection between a power supply cord and the electric burner element; the ceramic pot having a cooking cavity defined within a bottom exterior portion sized to fit into the ceramic pot receiving cavity of the cooker housing and an upper perimeter lip sized to contact and sit on an upper lip of the cooker housing when the bottom exterior portion is fit into the ceramic pot receiving cavity of the cooker housing; the disposable, formed aluminum sheeting liner member having a liner cooking compartment formed therein and sized to fit into the cooking cavity of the ceramic pot and having a liner lip formed into an upper perimeter lip engaging configuration for form fitting into connection with the upper perimeter lip of the ceramic pot; the cooking lid being sized to sit onto the liner lip to seal the liner cooking compartment; the storage lid having a lid lip shaped to engage and hold the liner lip of the aluminum sheeting liner member such that the liner cooking compartment is sealed.

Accordingly, a cooker system with disposable liner is provided. The cooker system with disposable liner includes a burner unit, a ceramic pot, a disposable, formed aluminum sheeting liner member, a cooking lid, and a storage lid; the burner unit including a cooker housing, an electric burner element positioned within a ceramic pot receiving cavity formed into the cooker housing and a burner intensity controller having a selector knob rotatably mounted to an exterior of the cooker housing and wired in connection between a power supply cord and the electric burner element; the ceramic pot having a cooking cavity defined within a bottom exterior portion sized to fit into the ceramic pot receiving cavity of the cooker housing and an upper perimeter lip sized to contact and sit on an upper lip of the cooker housing when the bottom exterior portion is fit into the ceramic pot receiving cavity of the cooker housing; the disposable, formed aluminum sheeting liner member having a liner cooking compartment formed therein and sized to fit into the cooking cavity of the ceramic pot and having a liner lip formed into an upper perimeter lip engaging configuration for form fitting into connection with the upper perimeter lip of the ceramic pot; the cooking lid being sized to sit onto the liner lip to seal the liner cooking compartment; the storage lid having a lid lip shaped to engage and hold the liner lip of the aluminum sheeting liner member such that the liner cooking compartment is sealed.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
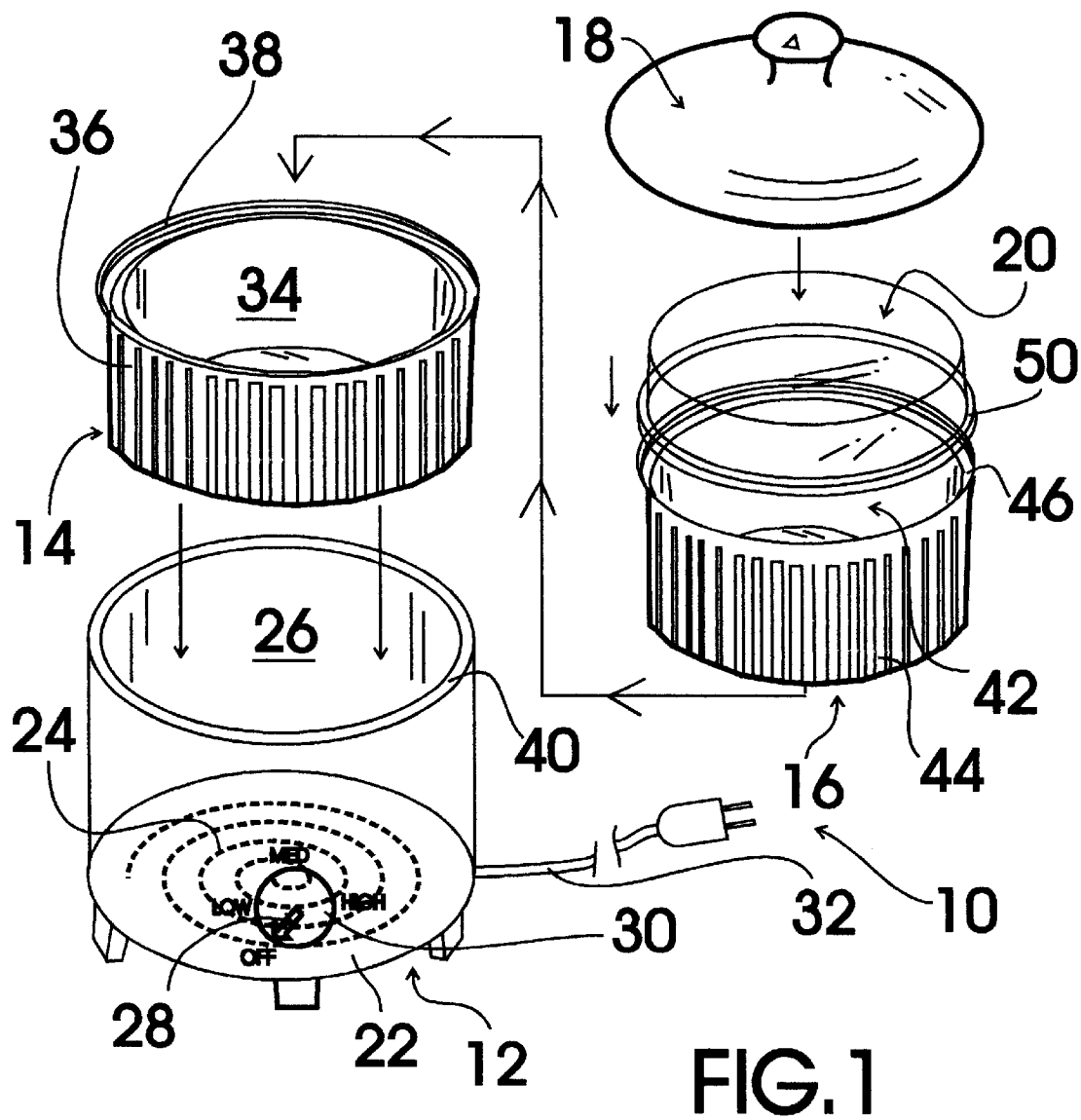
FIG. 1 is an exploded perspective view of an exemplary embodiment of the cooker system with disposable liner of the present invention showing the burner unit including the cooker housing, the electric burner element positioned within a ceramic pot receiving cavity formed into the cooker housing and a burner intensity controller having a selector knob rotatably mounted to an exterior of the cooker housing and wired in connection between a power supply cord and the electric burner element; the ceramic pot having a cooking cavity defined within a bottom exterior portion sized to fit into the ceramic pot receiving cavity of the cooker housing and an upper perimeter lip sized to contact and sit on an upper lip of the cooker housing when the bottom exterior portion is fit into the ceramic pot receiving cavity of the cooker housing; a disposable, formed aluminum sheeting liner member having a liner cooking compartment formed therein and sized to fit into the cooking cavity of the ceramic pot and having a liner lip formed into an upper perimeter lip engaging configuration for form fitting into connection with the upper perimeter lip of the ceramic pot; a cooking lid sized to sit onto the liner lip to seal the liner cooking compartment; and a storage lid having a lid lip shaped to engage and hold the liner lip of the aluminum sheeting liner member such that the liner cooking compartment is sealed.

FIG. 1 shows an exploded perspective view of an exemplary embodiment of the cooker system with disposable liner of the present invention generally designated 10. Cooker system 10 includes a burner unit, generally designated 12; a ceramic pot, generally designated 14; a disposable, formed aluminum sheeting liner member, generally designated 16; a cooking lid, generally designated 18, and a storage lid, generally designated 20.

Figure 2:
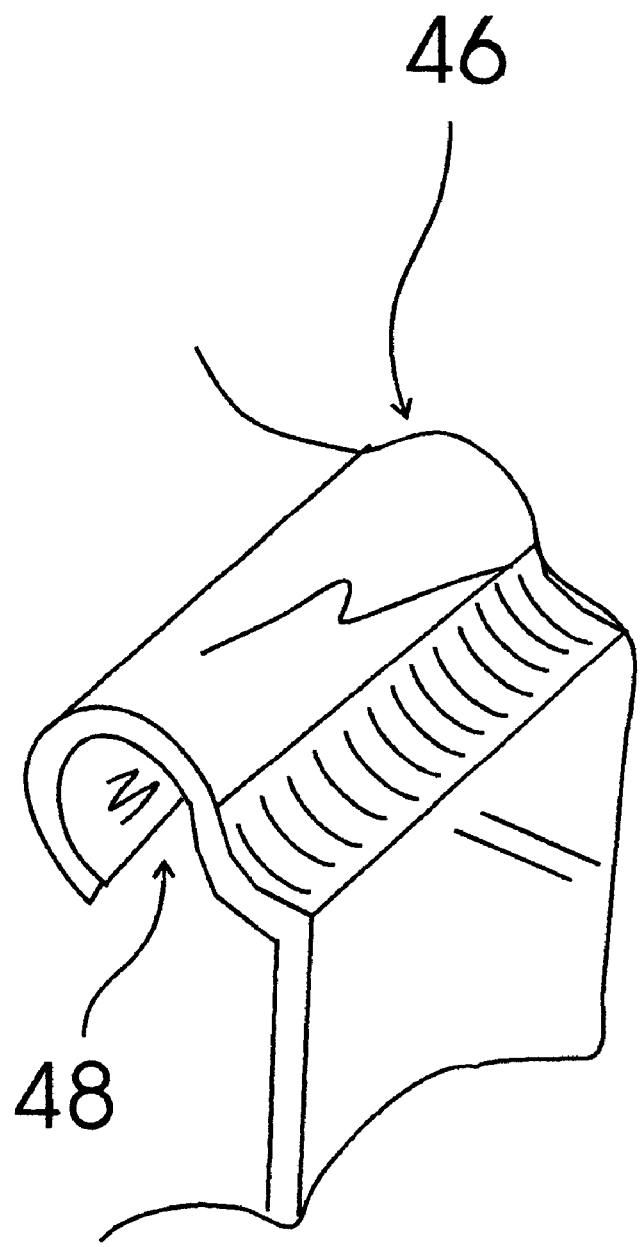
FIG. 2 is a detail perspective view showing a section of the liner lip having a question mark shaped configuration for seating over the upper perimeter lip of the ceramic pot.

Burner unit 12 includes a metal cooker housing 22, an electric burner element 24 (shown in dashed lines) positioned within a ceramic pot receiving cavity 26 formed into cooker housing 22 and a burner intensity controller, generally designated 28, having a selector knob 30 rotatably mounted to an exterior of cooker housing 22 and wired in connection between a power supply cord 32 and electric burner element 24. Ceramic pot 14 has a cooking cavity 34 defined within a bottom exterior portion 36 sized to fit into ceramic pot receiving cavity 26 of cooker housing 22 and an upper perimeter lip 38 sized to contact and sit on an upper lip 40 of cooker housing 22 when bottom exterior portion 36 is fit into ceramic pot receiving cavity 26 of cooker housing 22. Disposable, formed aluminum sheeting liner member 16 has a liner cooking compartment 42 formed therein and an a bottom 44 sized to form fit into cooking cavity 34 of ceramic pot 14 and has a liner lip 46, referring now to FIG. 2, formed into a question mark shaped, upper perimeter lip engaging configuration 48, referring back to FIG. 1, for form fitting into connection with upper perimeter lip 38 of ceramic pot 14.

Cooking lid 18 is constructed of glass and is sized to sit onto liner lip 46 to seal liner cooking compartment 42 during the cooking period. Storage lid 20 is of molded plastic construction and has a lid lip 50 shaped to engage and hold liner lip 46 of aluminum sheeting liner member 16 such that liner cooking compartment 42 is sealed. In use, multiple liner members 16 can be provided with cooker system 10 at the time of purchase and can be sold separately.

It can be seen from the preceding description that a disposable liner and a cooker system with disposable liner has been provided.

It is noted that the embodiment of the disposable liner and the cooker system with disposable liner described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:
1. A cooker system with disposable liner comprising:

a burner unit;

a ceramic pot;

a disposable, formed aluminum sheeting liner member;

a cooking lid; and a storage lid;

said burner unit including a cooker housing, an electric burner element positioned within a ceramic pot receiving cavity formed into said cooker housing and a burner intensity controller having a selector knob rotatably mounted to an exterior of said cooker housing and wired in connection between a power supply cord and said electric burner element;

said ceramic pot having a cooking cavity defined within a bottom exterior portion sized to fit into said ceramic pot receiving cavity of said cooker housing and an upper perimeter lip sized to contact and sit on an upper lip of said cooker housing when said bottom exterior portion is fit into said ceramic pot receiving cavity of said cooker housing; said disposable, formed aluminum sheeting liner member having a liner cooking compartment formed therein and sized to fit into said cooking cavity of said ceramic pot and having a liner lip formed into an upper perimeter lip engaging configuration for form fitting into connection with said upper perimeter lip of said ceramic pot;

said cooking lid being sized to sit onto said liner lip to seal said liner cooking compartment;

said storage lid having a lid lip shaped to engage and hold said liner lip of said aluminum sheeting liner member such that said liner cooking compartment is sealed.

* * * * *